Patented July 10, 1923.

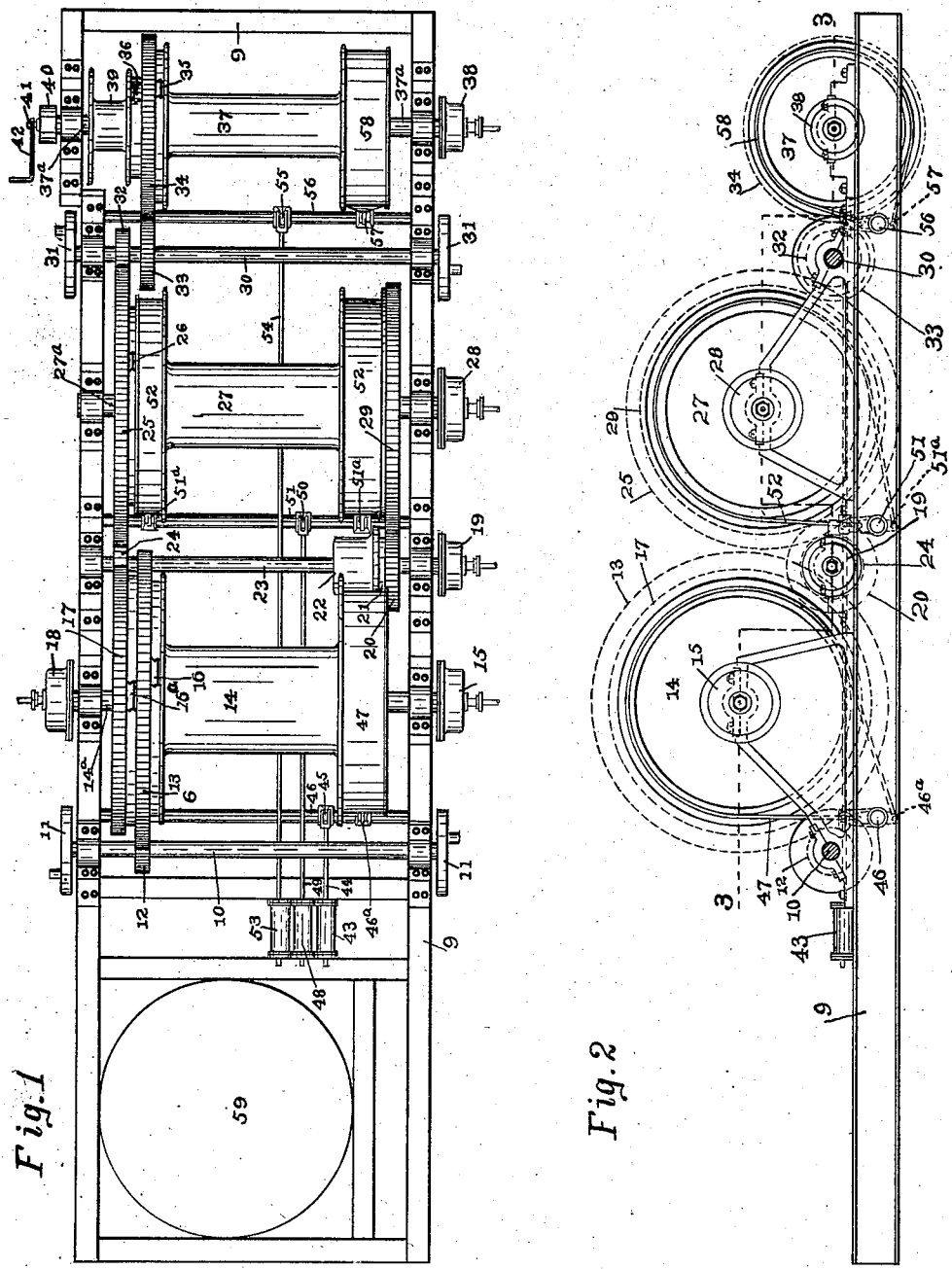
July 10, 1923.
O. A. WIRKKALA
LOGGING ENGINE
Filed April 21, 1921
1,461,338
2 Sheets-Sheet 1
INVENTOR,
Oscar A. Wirkkala.
BY David E. Lain,
ATTORNEY.

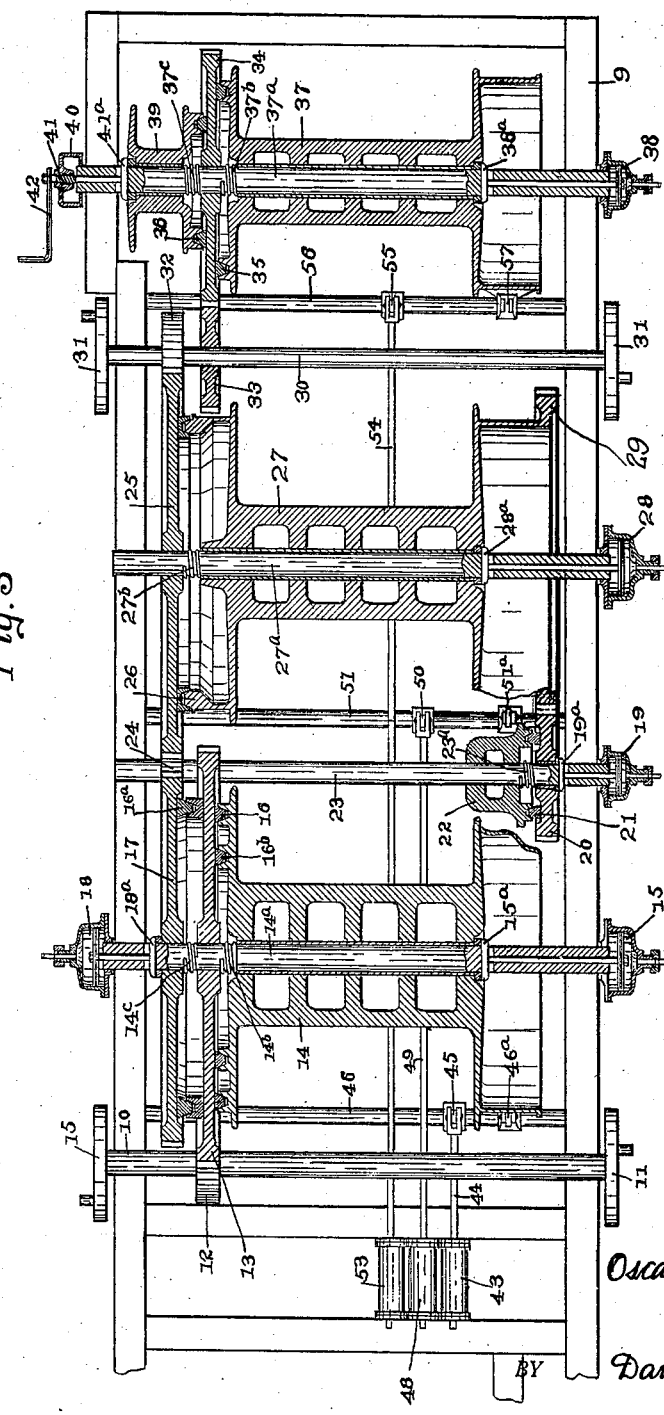

1,461,338

UNITED STATES PATENT OFFICE.

OSCAR A. WIRKKALA, OF ROME TOWNSHIP, WHATCOM COUNTY, WASHINGTON.

LOGGING ENGINE.

Application filed April 21, 1921. Serial No. 463,329.

*To all whom it may concern:*

Be it known that I, OSCAR A. WIRKKALA, a citizen of the United States, residing in Rome Township, in the county of Whatcom and State of Washington, have invented a new and useful Logging Engine, of which the following is a specification.

My invention relates to improvements in steam-power logging donkey engines, more especially those for use in slack, sky-line and gravity logging systems, and one of the objects of my improvements is to provide a steam logging donkey well adapted to operate a slack, sky-line or gravity logging system on ground too steep and too rough for rapid and safe logging with donkeys in present use. Another object of my improvements is to provide a logging donkey capable of logging over a greater area, when operating the slack, sky-line system than is possible with other donkeys. Another object of my improvements is to provide a logging donkey having greater drum speed and more braking power for said drums than is usual. Another object of my improvements is to provide a logging donkey having its drums in single column relation, thereby requiring only a narrow frame which is convenient for transportation, and also requiring but a single spar tree near the donkey while the two-column machines require two spar trees. Another object of my invention is to provide a logging donkey that can log across canyons with less cable strain than usual. Another object of my improvements is to provide a donkey in which the main-line hauling drum is operable at two speeds by both power shafts used simultaneously. And a further object of my improvements is to provide a logging donkey which requires fewer operatives for the logging operations than usual. Additional objects of my improvements will appear as the description proceeds.

I attain these objects with the mechanism illustrated in the accompanying two sheets of drawings in which Figure 1 is a plan view of a four cylinder, four drum, double, two speed, slack sky-line, steam, logging, donkey engine; Fig. 2 is a side elevation of Fig. 1; and Fig. 3 is a sectional view of Fig. 2 on the bent line 3—3 drawn on a larger scale.

Similar characters refer to similar parts throughout.

Certain parts are broken away to show other parts hidden thereby.

More particularly: 9 is the base frame of a steam, logging, donkey engine.

10 is a sky-line engine crank shaft mounted in bearings fastened to frame 9 for revolution.

11, 11 are crank discs fixed on the ends of shaft 10 each having a crank pin set quartering. The engines for operating shaft 10 are omitted from the drawings.

12 is a pinion mounted fixed on shaft 10.

13 is a bull, spur gear mounted fixed on drum shaft 14$^a$ engaged with gear 12.

14 is a sky-line cable drum mounted loose on shaft 14$^a$ for revolution thereon or therewith.

14$^a$ is a drum shaft mounted for revolution in bearings fastened to frame 9.

14$^b$ and 14$^c$ are helical springs on each side of gear 13 mounted on shaft 14$^a$ to bear against said gear and drum 14, and gear 17 respectively.

15 is a short steam cylinder mounted fixed on the front end of shaft 14$^a$ to revolve therewith. A steam pipe is connected to said cylinder at its turning center with a packed turning joint. Said cylinder also has a steam piston reciprocable therein with a piston rod mounted in a central bore in said drum shaft the inner end of which bears on friction key 15$^a$. This part of the equipment is known as a "steam friction" and will hereinafter be referred to as steam friction 15. When steam enters said cylinder through said steam pipe connected thereto said piston rod is caused to bear against said friction key forcing drum 14 rearward on its shaft.

For the purpose of this specification the front side of this engine is that side shown in Fig. 2, and the front end is the end at the right hand in Fig. 2.

15$^a$ is a friction key mounted in a transverse slot in shaft 14$^a$ to bear sidewise on the front end of the hub of drum 14. Said slot is wider than said key lengthwise of said shaft in which direction it is movable.

16, 16$^b$ are two annular, concentric friction blocks mounted fixed on the front face of gear 13, frictionally engageable in two concentric, friction, annular grooves in the rear end of drum 14.

16$^a$ is an annular friction block fixed on the front side face of gear 17, frictionally engageable with an annular groove in the rear side face of gear 13.

17 is a spur gear mounted loose on shaft 14$^a$, revolvable thereon or therewith, and, through friction block 16$^a$, frictionally engageable therewith.

18 is a steam friction, similar to 15, mounted fixed on the rear end of shaft 14$^a$ with the inner end of its piston rod bearing on friction key 18$^a$.

18$^a$ is a friction key mounted for slight sidewise movement in a transverse slot in shaft 14$^a$, bearing against the rear end of the hub of gear 17. Said gear is movable on said shaft into frictional engagement with bull spur gear 13 by pressure from steam in 18 operating to force said friction key to bear against gear 17.

19 is a steam friction, similar to 15, mounted fixed on the front end of shaft 23 to revolve therewith, with its piston rod bearing on friction key 19$^a$.

19$^a$ is a friction key mounted in a transverse slot in shaft 23 to bear on the front end of the hub of gear 20.

20 is a spur pinion mounted loose on shaft 23.

21 is an annular friction block fixed to gear 20 and engageable, frictionally, with clutch 22.

22 is a friction clutch mounted fixed on shaft 23, frictionally engageable with gear 20.

23 is a shaft mounted for revolution in bearings fastened to frame 9.

23$^a$ is a helical spring mounted on shaft 23 between gear 20 and clutch 22 bearing against both.

24 is a pinion mounted fixed on shaft 23 in engagement with gears 17 and 25.

25 is a main gear wheel mounted fixed on shaft 27$^a$.

26 is an annular friction block fastened to the rear end of drum 27, frictionally engageable with an annular groove in gear 25.

27 is a main-line hauling drum mounted loose on shaft 27$^a$ for revolution thereon or therewith.

27$^a$ is a shaft mounted for revolution in bearings fastened to frame 9.

28 is a steam friction, similar to 15, mounted fixed on the front end of shaft 27$^a$, the piston rod of which bears on friction key 28$^a$.

28$^a$ is a friction key mounted in a transverse slot in shaft 27$^a$ to bear against the front end of the hub of drum 27.

29 is a spur gear mounted fixed on the front end of drum 27 in engagement with gear 20.

30 is a main-engine crank shaft mounted for revolution in bearings fastened to frame 9.

31, 31 are crank discs mounted fixed on the ends of shaft 30 each having a crank pin set quartering. Connecting rods of two steam engine pistons not shown are connected to crank discs 31, 31 on said shaft 30.

32 is a pinion mounted fixed on shaft 30 engaged with gear 25.

33 is a pinion mounted fixed on shaft 30 engaged with gear 34.

34 is a haul-back gear mounted fixed on shaft 37$^a$.

35 is an annular friction block fastened to the front side of gear 34, engageable with an annular groove in the rear end of drum 37.

36 is a friction block fastened to the rear side of gear 34, engageable with an annular groove in the front end of drum 39.

37 is a haul-back drum mounted loose on shaft 37$^a$.

37$^a$ is a shaft mounted for revolution in bearings fastened to base 9.

38 is a steam friction, similar to 15, mounted fixed on the front end of shaft 37$^a$, its piston bears on friction key 38$^a$.

38$^a$ is a friction key mounted in a transverse slot through shaft 37$^a$ and bears against the front end of the hub of drum 37.

39 is a draw-line drum mounted loose on the rear end of shaft 37$^a$, frictionally engageable with gear 34.

37$^b$ and 37$^c$ are two helical springs mounted on shaft 37$^a$, one on each side of gear 34, bearing on said gear and on drums 37 and 39 respectively.

40 is the housing of a hand friction mounted fixed on the rear end of shaft 37$^a$.

41 is a threaded friction pin engaged in a tapped hole in housing 40 and mounted in a bore in shaft 37$^a$, its inner end bearing against friction key 41$^a$.

41$^a$ is a friction pin mounted in a transverse hole through shaft 37$^a$ and bears against the rear end of the hub of drum 39.

42 is a hand crank fastened to the outer end of friction pin 41 adapted to revolve the same.

43 is a steam cylinder, having a piston, fastened to frame 9.

44 is a piston rod hinged to said piston and having its outer end connected to crank 45.

45 is a crank fixed on rocker shaft 46.

46 is a rocker shaft mounted for rocking in bearings on frame 9.

46$^a$ is a double crank fixed to shaft 46 the ends of which are connected to brake band 47.

47 is a brake band mounted on a cylindrical part of the front end flange of drum 14.

48 is a steam cylinder, having a piston, fastened to frame 9.

49 is a piston rod hinged to said piston with its outer end connected to crank 50.

50 is a crank fixed to rocker shaft 51.

51 is a rocker shaft mounted for rocking in bearings fastened to frame 9.

51ª is a double crank fixed to shaft 51 having its ends connected to the ends of brake band 52.

52 is a brake band mounted on a cylindrical extension of the front-end flange of drum 27.

53 is a steam cylinder, having a piston, fastened to the frame 9.

54 is a piston rod hinged to said piston and having its outer end connected to crank 55.

55 is a crank fixed to rocker shaft 56.

56 is a rocker shaft mounted for rocking in bearings fastened to frame 9.

57 is a double crank fixed to shaft 56 the ends of which are connected to the ends of brake band 58.

58 is a brake band mounted on a cylindrical extension of the front-end flange of drum 37.

59 is a plan of the location of a steam boiler on frame 9.

I have been granted Patent No. 1,251,157 which pertains to a four cylinder, four drum, single and double, two speed, slack sky-line, yarder and roader, steam, logging donkey engine. There are limitations of cable capacity, brake service, and convenience of handling, discovered in the practical use of donkeys made under said patent which my present invention is intended to remove.

In operation: For yarding up hill at slow speed, bull gear 13 is caused to engage sky-line drum 14, gear 17 is loose, brake 47 is set, holding said sky-line drum gear 20 is loose, gear 25 is caused to engage main-line drum 27, brake 52 is loose, haulback drum 37 and draw-line drum 39 are loose. Now place haulback-line drum 37 under control with light pressure from brake 58, and cause engine shaft 30 to revolve when main-line drum 27 is slowly revolved and the log or turn of logs are slowly yarded up hill while the haulback drum slowly pays out its line. This action continues till said turn is yarded in when gear 13 is released from drum 14 and said drum is allowed to slowly pay out the sky line to permit the turn to lie on the ground and further to allow sufficient slack in the fastening gear to permit the same to be disengaged from the logs.

To send back the logging gear for another turn; gear 13 is engaged with drum 14, engine shaft 10 is caused to revolve till the sky line is taut when said engine shaft is stopped and brake 47 is set on said drum to hold said sky line taut. Then main-line drum 27 is freed from gear 25 and held under light friction by brake 52 while gear 34 is engaged with drum 37 and engine shaft 30 is caused to revolve which rapidly revolves drum 37 and quickly carries said logging gear to the place on the line nearest the point of next loading. This accomplished, brake 47 is eased to allow slack in the sky line to permit fastening to the next turn; when this is done sky-line slack is taken up by drum 14 till one end of the turn of logs is in the air and the other end on the ground, which position of the turn is maintained by use of drum 14 till said turn is hauled in.

For rapid yarding down hill, gear 20 is engaged with clutch shaft 23 and engine shaft 30 is caused to revolve thus turning main-line drum 27 at high speed through gears 32, 25, 24, 20 to 29, which latter is fixed to said drum.

To use the power of both engines simultaneously for yarding, the sky line is held by brake 47 on drum 14, gear 13 is made loose from drum 14 and engaged with gear 17, gear 20 is loose, engine shaft 10 is caused to revolve and power therefrom is deliverd to drum 27 through gears 12, 13, 17, 24 to 25, which latter is engaged with drum 27. Also, engine shaft 30 is caused to revolve and power from the same is delivered to drum 27 through gear 32 to said gear 25. In this manner power from both engines is caused to operate drum 27 for heaviest up-hill work.

To connect engine shaft 10 to sky-line drum 14, alone, gear 13 is connected to drum 14 and gear 17 is made loose from gear 13.

To connect engine shaft 10 to main-line drum 27, alone, for slow speed, gear 13 is made loose from drum 14 and engaged with gear 17, gear 20 is made loose from clutch 22, gear 25 is connected to drum 27, and gear 34 is made loose from drum 37; while for high speed the same connections are made excepting gear 25 is made loose from drum 27 and gear 20 is connected to clutch 22.

To connect engine shaft 10 with drum 37, alone, gear 13 is made loose from drum 14 and connected to gear 17, gear 25 is made loose from drum 27, drum 39 is made loose from gear 34 and said gear is connected to drum 37.

To connect engine shaft 30 with drum 37, alone, drum 39 is made loose from gear 34, said gear is then connected to drum 37, gear 25 is made loose from drum 27 and gear 17 is made loose from gear 13.

To connect engine shaft 30 with drum 27, alone, for slow speed, drum 37 and drum 39 are both made loose from gear 34, gear 25 is connected to drum 27, gear 17 is made loose from gear 13 and gear 20 is made loose from clutch 22; while to make connections for high speed the same connections are made excepting gear 25 is made loose from drum 27 and gear 20 is connected to clutch 22.

And finally, to drive drum 14, alone from engine shaft 30, drums 39 and 37 are made loose from gear 34, gear 25 is made loose from drum 27, gear 17 and drum 14 are connected to gear 13, steam is shut off from the engine connected to shaft 10 and the exhaust cocks of said engine are opened, permitting the pistons of said engine freedom of movement in their cylinders, which will allow engine shaft 10 to be turned without resistance.

In sky-line logging the logs are best carried with one end in the air and the other end trailing on the ground. This position of the logs prevents their being "held up" by engaging with stumps or other logs and yet places only on half the weight on the sky line that it must bear when said logs are entirely free from the ground. When logs are being transported over canyons my donkey can be controlled, as already explained, to trail said logs down to the canyon floor, across the same and up the other bank.

Since all of the separable power connections on my logging donkey are friction clutches, it follows that changes of power connections can be made during operation of the machine under load.

The ability to operate drum 27 at either of two speeds is important for rapid work. Attention is also further directed to the importance of having two independent power units, either or both of which are made directly applicable to each of the drums during operations. This power subdivision is made of increased utility by having each unit able to conduct ordinary operations alone. Then in the event of the disability of one power unit, work can proceed with the other alone.

Having thus fully disclosed my invention, what I claim as new and desire to secure by Letters Patent is,—

1. In a logging donkey engine in combination, a donkey engine frame, three cable drums mounted in column on parallel shafts for rotation on said frame, two prime-mover shafts mounted parallel with said drum shafts for revolution on said frame, separately controllable power connections between each of said prime-mover shafts and each of said drums adapted to transmit power of rotation from either of said prime-mover shafts to each of said drums without connection with either of the other of said drums, and separately controllable means to operate each of said prime-mover shafts.

2. In a logging donkey engine in combination, an engine frame, three hauling drums mounted in column for revolution on parallel shafts on said frame, two engine shafts mounted parallel with said drum shafts on said frame for revolution, separately controllable driving connections between said engine shafts and said drums adapted to connect either of said engine shafts to each of said drums and also adapted to connect both of said engine shafts simultaneously with one of said drums, and means to revolve each of said engine shafts independently of the other.

3. In a logging donkey engine in combination, a donkey engine, three hauling drums mounted in column for revolution on parallel shafts on said frame, two engine shafts mounted for revolution on said frame parallel with said drum shafts, a fourth hauling drum mounted for revolution on one of said drum shafts, controllable driving connections between each of said engine shafts and each of said three drums adapted to transmit power of rotation from either of said engine shafts to each of said three drums separately, separately controllable means to rotate each of said engine shafts, and controllable means to connect said fourth drum to the shaft on which it is mounted for rotation therewith.

4. In a logging donkey engine in combination, a donkey engine frame; three parallel cable-drum shafts mounted for revolution in bearings on said frame; three loose cable drums in column relation, one mounted for revolution on each of said drum shafts; three separately controllable and actuated brakes one applicable to each of said drums whereby the revolution of each of said drums is decreased or stopped; two prime-mover shafts mounted parallel for revolution in bearings on said frame, one to the rear of said column of drums and one between the front and middle ones of said drums; a counter shaft mounted for revolution in bearings on said frame parallel with said drum shafts and between said rear and middle drums; three fixed spur gears, one mounted on each of said drum shafts and frictionally engageable with said drum thereon; a spur gear fastened on the front end of said middle drum concentric therewith; a loose spur gear mounted for revolution on said rear drum shaft between said fixed spur gear and said frame; means adapted to engage said loose gear with said fixed gear; a fixed spur gear mounted on said countershaft engaged with said loose gear on said rear drum shaft and also engaged with said fixed gear on said middle drum shaft; a fixed gear on said rear prime-mover shaft engaged with said fixed gear on said rear drum shaft; a smaller fixed gear on said front prime-mover shaft engaged with said fixed gear on said middle drum shaft; a larger fixed gear on said front prime-mover shaft engaged with said fixed gear on said front drum shaft; a fixed friction clutch on said counter shaft; a loose spur gear mounted for revolution on said countershaft frictionally engageable with said friction clutch thereon and engaged with said gear fastened on said middle drum; separately controllable power means adapted to frictionally engage each of said fixed gears on each of said drum shafts with the said drum thereon; controllable power means adapted to frictionally engage said countershaft clutch with said loose gear on said countershaft, and controllable power means adapted to revolve said prime-mover shafts separately or jointly, whereby power from either of said power shafts is transmitted to revolve either of two of said drums at one speed for each and said other drum at either of two speeds or the power from both of said power shafts is simultaneously caused to revolve either of two of said drums at one speed for each and said other drum at either of two speeds while the other drums are under said brake control, and further whereby said transmission of power is divertable from one of said drums to another during operations.

5. In a logging donkey engine in combination, a donkey engine frame; three cable drums mounted in column on parallel shafts for rotation on said frame; another cable drum mounted for rotation on one of said shafts; two prime-mover shafts mounted parallel with said drum shafts for revolution on said frame; separately controllable power connections between each of said prime-mover shafts and each of said drums adapted to transmit power of rotation from either of said prime-mover shafts to each of said drums without connection with either of the other of said drums and separate means to operate each of said prime-mover shafts.

6. In a logging donkey engine in combination, a donkey engine frame; three parallel cable drum shafts mounted for rotation in bearings on said frame; three cable drums in column each mounted for rotation on one of said shafts; three separately actuated and controllable brakes, one applicable to each of said drums, whereby the revolutions of said drums are reduced or stopped; a countershaft mounted in bearings on said frame for revolution parallel with said drum shafts; two separately actuated and controllable power shafts mounted in bearings on said frame parallel with said drum shafts for revolution; separately controllable power connections, exclusive of said countershaft, between each of said power shafts and each of said drums adapted to transmit power of rotation from either of said power shafts separately or both simultaneously to each of said drums separately whereby said drums are caused to revolve at one speed for each, and through said countershaft whereby one of said drums is caused to revolve at another speed, while said other drums are held under control of said brakes; and separately controllable power means adapted to revolve either of said power shafts alone or both simultaneously.

7. In a logging donkey engine in combination, a donkey engine frame; three parallel cable drum shafts mounted for revolution in bearings on said frame; three cable drums in column each mounted for revolution on one of said shafts; three separately actuated and controllable brakes, one applicable to each of said drums, whereby the revolutions of said drums are reduced or stopped; a countershaft mounted in bearings on said frame for revolution parallel with said drum shafts; a power shaft mounted in bearings on said frame for revolution parallel with said drum shafts; controllable power connections, exclusive of said countershaft, between said power shaft and each of said drums adapted to transmit power of rotation from said power shaft to each of said drums separately whereby said drums are caused to revolve at one speed for each, and through said countershaft whereby one of said drums is caused to revolve at another speed, while said other drums are held under control of said brakes; and controllable power means adapted to revolve said power shaft.

OSCAR A. WIRKKALA.